United States Patent [19]

Gensberger et al.

[11] Patent Number: 4,995,586

[45] Date of Patent: Feb. 26, 1991

[54] SOLENOID VALVE

[75] Inventors: Karl Gensberger, St. Ingbert; Joachim Morsch, Marpingen, both of Fed. Rep. of Germany

[73] Assignee: Hydac Technology GMBH, Fed. Rep. of Germany

[21] Appl. No.: 425,231

[22] Filed: Oct. 23, 1989

[30] Foreign Application Priority Data

Nov. 4, 1988 [DE] Fed. Rep. of Germany ... 8813817[U]

[51] Int. Cl.$^5$ .............................................. F16K 31/40
[52] U.S. Cl. ............................ 251/30.04; 251/129.04; 251/129.08
[58] Field of Search ................ 251/129.04, 129.08, 251/30.04

[56] References Cited

U.S. PATENT DOCUMENTS 4,386,626  6/1983  Hehl ........................... 251/129.08 X
4,774,976 10/1988  Janecke et al. ............. 251/129.08 X

FOREIGN PATENT DOCUMENTS 2701580  7/1978  Fed. Rep. of Germany.
2920670 11/1980  Fed. Rep. of Germany ........................ 251/129.08
3528296  2/1987  Fed. Rep. of Germany.

Primary Examiner—Arnold Rosenthal
Attorney, Agent, or Firm—Roylance, Abrams, Berdo & Goodman

[57] ABSTRACT

A solenoid valve includes an operating magnet which controls movement of an armature against the effect of a valve spring, which armature in turn controls the movement of a valve member connected with the armature by a sliding connection. The armature has a control member which can be introduced into a coil with an exciter winding. The coil is part of an electronic circuit provided for control of the cross section of the fluid flow passage of the valve.

19 Claims, 3 Drawing Sheets

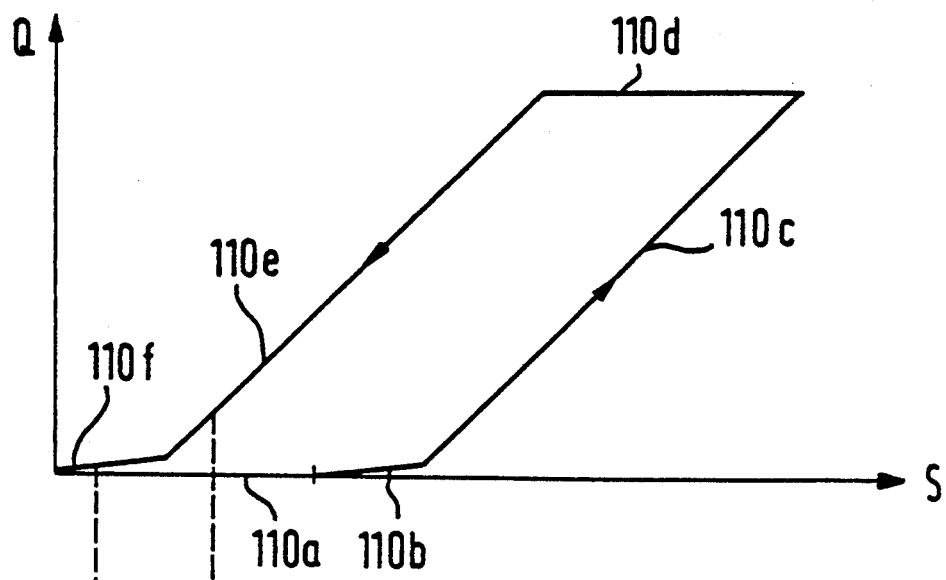
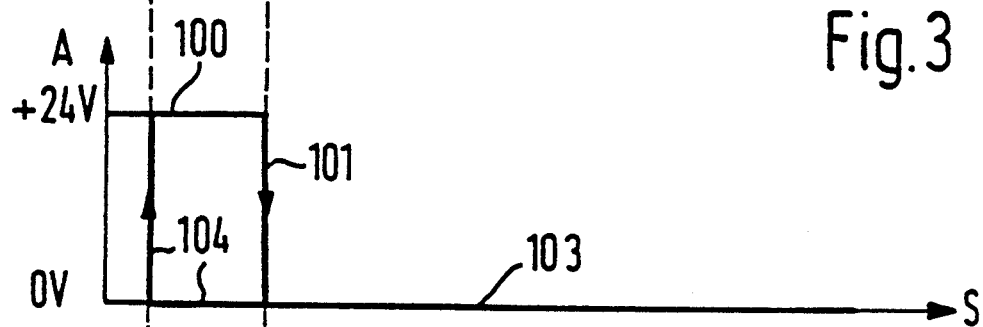
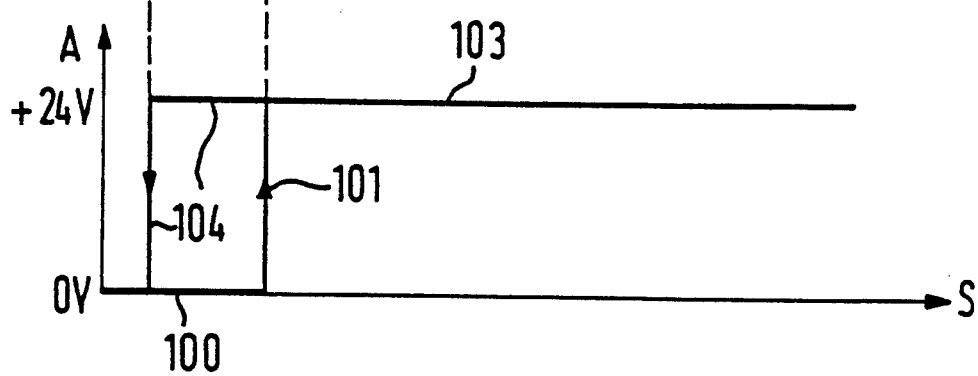
Fig.3

*4,995,586*

SOLENOID VALVE

FIELD OF THE INVENTION

The present invention relates to a solenoid valve with a magnet for its operation. The armature of the magnet controls movement of a valve member connected with the armature by a sliding connection against the effect of a valve spring.

BACKGROUND OF THE INVENTION

A solenoid valve of this type, in which the connection passage between a pressure source and a user, for instance a hydraulic press connected to the pressure source, can be blocked or freed, is disclosed in German Offenlegungsschrift No. 35 28 296. In solenoid valves of this type, the traditional valve seat against which the valve member presses in its closed setting is a mechanical hard stop. The absolute seal of the valve is guaranteed only when this hard stop setting has been attained.

Security considerations require unequivocal control of the closed valve setting. Since the valve member moves only a few millimeters from its open setting into its closed setting or vice versa, forming either the completely closed or the completely open or free state of the connection passage requires maintaining a high level of precision in the measurements made for certain detection of the switch setting of the valve member on an electronic passage control device directly controlling the valve member.

Thus, the realization of reliable control of the valve member by means of electronic structural components has not been executable up until this time.

SUMMARY OF THE INVENTION

An object of the present invention is to provide a solenoid valve in which the closed setting of the valve member can be safely, securely and precisely controlled by an electronic control device for the cross section of the valve passage.

The foregoing object is obtained by a solenoid valve, comprising a fluid flow passage with a cross section, an operating magnet, an armature mounted within the operating magnet for reciprocating movement, and a valve member connected to the armature by a sliding connection permitting limited relative axial movement between the valve member and the armature. The movement of the valve member is controlled by the armature. A valve spring biases the armature toward a closed position of the valve. A control member extends from the armature. Electronic circuit means controls the cross section of the fluid flow passage and includes a coil with an exciter winding. The control member is received and movable in the coil.

The winding serves as part of an electric circuit for controlling the movement of the valve member. Upon operation of the armature, the control member connected with the armature of the magnet is moved into the winding including the exciter winding. This movement of the control member causes a modification of the inductivity of the winding at that point, and consequently, delivers a signal to the electronic control mechanism of the passage, if the valve member is still located in its definitively closed or completely open setting. During operation of the valve member, the control member movement within the winding covers a considerably greater distance than the valve member alone, if the movement of the armature of the magnet is included. This is facilitated by the electronic circuit serving for control of the movement, even with a low degree of precision of measurement in the circuit itself, for reliable determination of the position of the valve member.

In one especially preferred embodiment, the circuit for control of the movement includes a known switching circuit for proximity switches. The return circuit of the known switching circuit is connected with the winding. A switching circuit element is also present which produces a switching hysteresis. By virtue of this fact, a switching circuit member producing switching hysteresis having a selected hysteresis in comparison with an introduction threshold will signal the closed valve setting in which the open setting of the valve member is indicated. An outer smaller switch phase between the valve member and the seat of the valve is attained as a result of this hysteresis. At a selected closed setting of the valve member, the signal "valve closed" is given by the control system, although the valve member need not yet have reached its absolute closed position. In other words, the valve member may not yet be in engagement with the valve seat.

Thus, in the presence of uncleanness or contamination of some sort on the valve seat or in the valve member, with mechanical instabilities and tolerances, or occlusion or the like, which can hinder or proscribe a complete closing of the valve member, the closed setting is still signaled. Leakages indeed occur as a result of shortcomings of this sort. In other words, the connection passage between pressure source and user is not completely blocked. However, the pressure medium is coming out of the pressure source in only a minimal flow, and still leads to only slight movements for the mover (actuator). Thus, in the case of the mover (actuator) being a hydraulic press, the pressure stamp of this press would simply be moved more slowly and also in a manner which is dangerous for the operation.

In the case of one especially preferred embodiment, the electronic control of the cross section of the passage includes two output points which are of opposite polarity to one another. The opposing polarity of these output points allows for reliable recognition of a cable rupture within the control by means of a series-connected logic of an electronic control mechanism, which contributes to increased reliability and effectiveness.

According to another preferred embodiment, the sliding connection includes a sliding member connected securely with the valve member or with the armature of the magnet. The sliding member engages between two shoulders of one of the armature or valve member and having some axial sliding play. The connection between the valve member and the armature of the magnet is thus constructed as a type of universal connection. During the manufacture and finishing of parts, such a connection is also subject to the occurrence of disadvantageous dimensional discrepancies, whereupon a higher operational reliability (safety) of the solenoid valve is attained.

In another preferred embodiment, the valve member forms a servo phase of the solenoid valve, another part forms a principal phase of the valve. By means of the servo phase on which the valve spring engages, it is possible, under frictional connection and form-locking force, to bring the principal phase of the valve member to block the connection passage between pressure source and user when the valve is in its closed position, as soon as the operation magnet is no longer being operated. This has the advantage that, despite the presence of uncleanness, occlusions or the like, which can lead the obstruction of the movement of the principal phase to the closed position in the solenoid valve, the principal phase is moved by the servo phase in the direction of its valve seat and so is pressed into that seat. Thus, any leakage occurring in the closed position does not lead to an unacceptable high flowthrough.

In another especially preferred embodiment, the principal phase of the valve member is a piston having a conical seat part turned toward the valve seat. At the beginning of the opening of the valve, the opening cross section formed by the valve seat and the seat part of the principal phase is greatly reduced, so that a fine control of the flowthrough volume is possible with this arrangement. Furthermore, errors in the range of tolerance arising from the manufacturing process could be compensated, and with that compensation their effect on the leakage rate could be limited.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 3 is a flow diagram representing the solenoid valve of FIG. 1, with two shifting diagrams arranged therein, which show the shift states at both of the output points A and $\overline{A}$ at both ends of the electronic device for control of the passage, which outputs are of opposite polarity to one another.

DETAILED DESCRIPTION OF THE INVENTION

Figure 1:
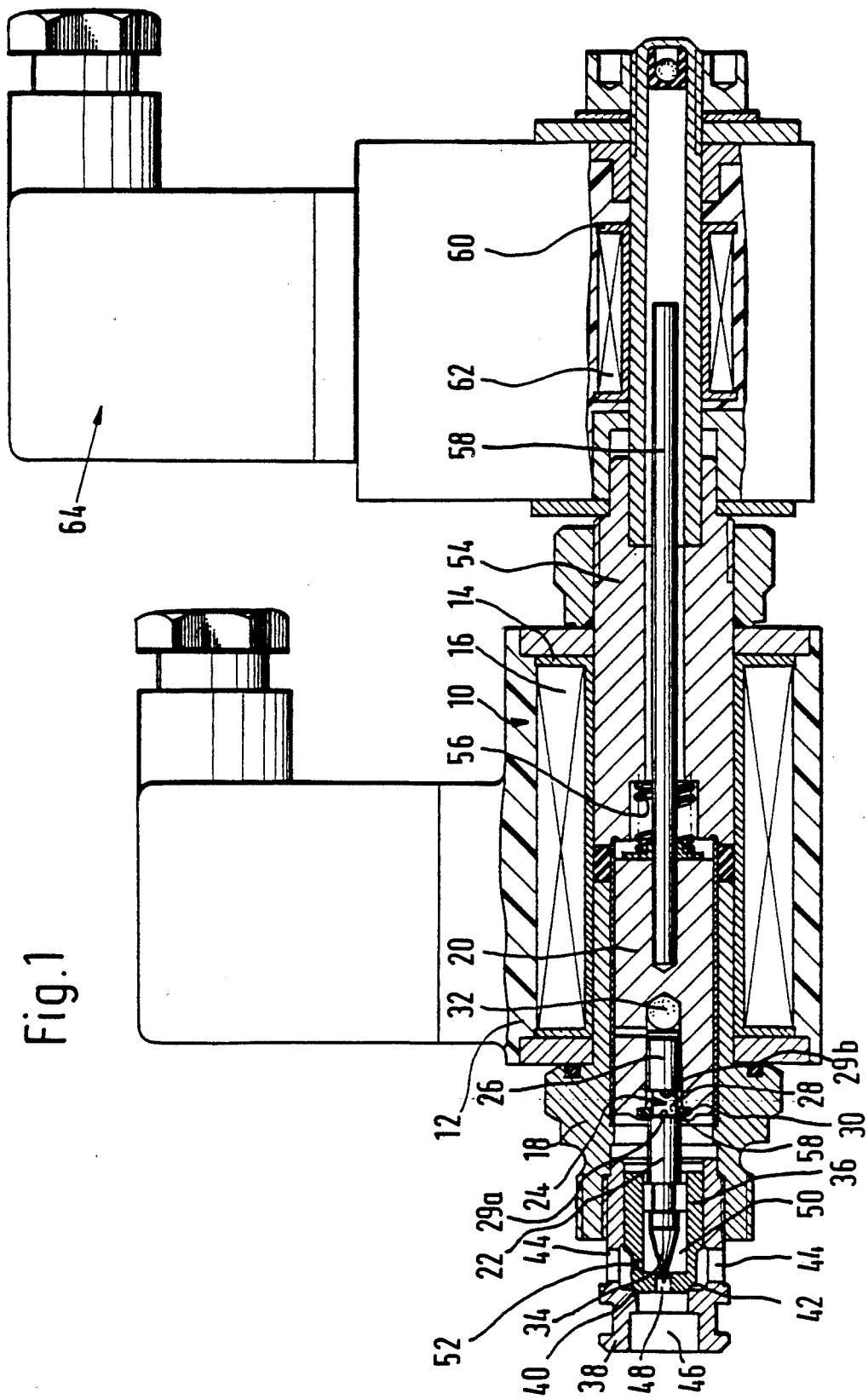
FIG. 1 is a side elevational view in section of a solenoid valve according to an embodiment of the present invention.

The solenoid valve 10, illustrated in FIG. 1, is essentially described relative to its mechanical structural components in German Offenlegungsschrift No. 35 28 296, corresponding to U.S. Pat. No. 4,783,051, the subject matter of which is hereby incorporated by reference. The details of the mechanical structure of solenoid valve 10 are only described in relationship with the electronic control of the passage.

Solenoid valve 10 has an operation magnet 12 which includes an exciter winding 16 wound on a coil 14. A magnet housing 18 projects into coil 4 from the left side in FIG. 1. An armature 20 of the magnet, is received in and is longitudinally slidable in housing 18.

As shown in FIG. 1, to the left of armature 20, a valve member 22 serves as a servo phase and is connected with armature 20 by a sliding connection, indicated in its entirety as 24. To produce the sliding connection 24, valve shaft 26 of valve member 22 includes an annular tee-slot or groove 28 with two shoulders 29a and 29b. Groove 28 receives a sliding disk 30 which can be introduced from the side on armature 20, with some axial sliding play and with radial play. The valve shaft 26 rests axially against armature 20 on a supporting ball bearing 32.

The end of valve member 22 opposite armature 20 has a conically tapered point 34. Point 34 operates in conjunction with a piston 36, configured as the principal phase of valve member 22. Piston 36 is configured as a hollow body and feeds into a sheathing 38. Sheathing 38 is screwed into magnet housing 18 in the axial direction and is guided longitudinally slidably therein. This sheathing 38 has a conically configured seat part 40 on its side turned toward piston valve seat 42 to provide for the cooperation of piston 36 and sheathing 38 extending annularly around the piston. Sheathing 38 has two input bores 44 which can be connected with a pressure source, for instance a hydraulic source (not shown), and one discharge bore 46 which can be connected with a user, for instance a press.

The connection passage between input bores 44 and discharge bore 46 is blocked or freed essentially by the piston 36 being in its closed or open setting, respectively. A first opening 48 extending all the way through piston 36 connects hollow chamber 50 of piston 36 and discharge bore 46. Furthermore, piston 36 has a second opening 52 extending radically all the way through connecting hollow chamber 50 of piston 36 with input bores 44. When piston 36 is in its closed setting, shown in FIG. 1, valve member 22 has conically tapered point 34 engaged in first opening 48 of piston 36 such that point 34 of valve member 22 is set in engagement with a part of the bore wall of the first opening 48.

On the other hand, a valve spring 56 configured as compression spring is engaged on the end of armature 20 opposite or remote from valve member 22. Spring 56 rests on the pole shoe 54 of solenoid valve 10. A rod-like, circular cylindrical control member 58, with some radial play, is guided into this valve spring 56. Member 58 is connected fixedly at one end with armature 20. At its other end, member 58 is introduced into coil 60 with an exciter winding 62. The rod-like control member 58 is furthermore arranged in pole shoe 54 and in coil 60 so as to be axially slidably and have some radial play.

Figure 2:
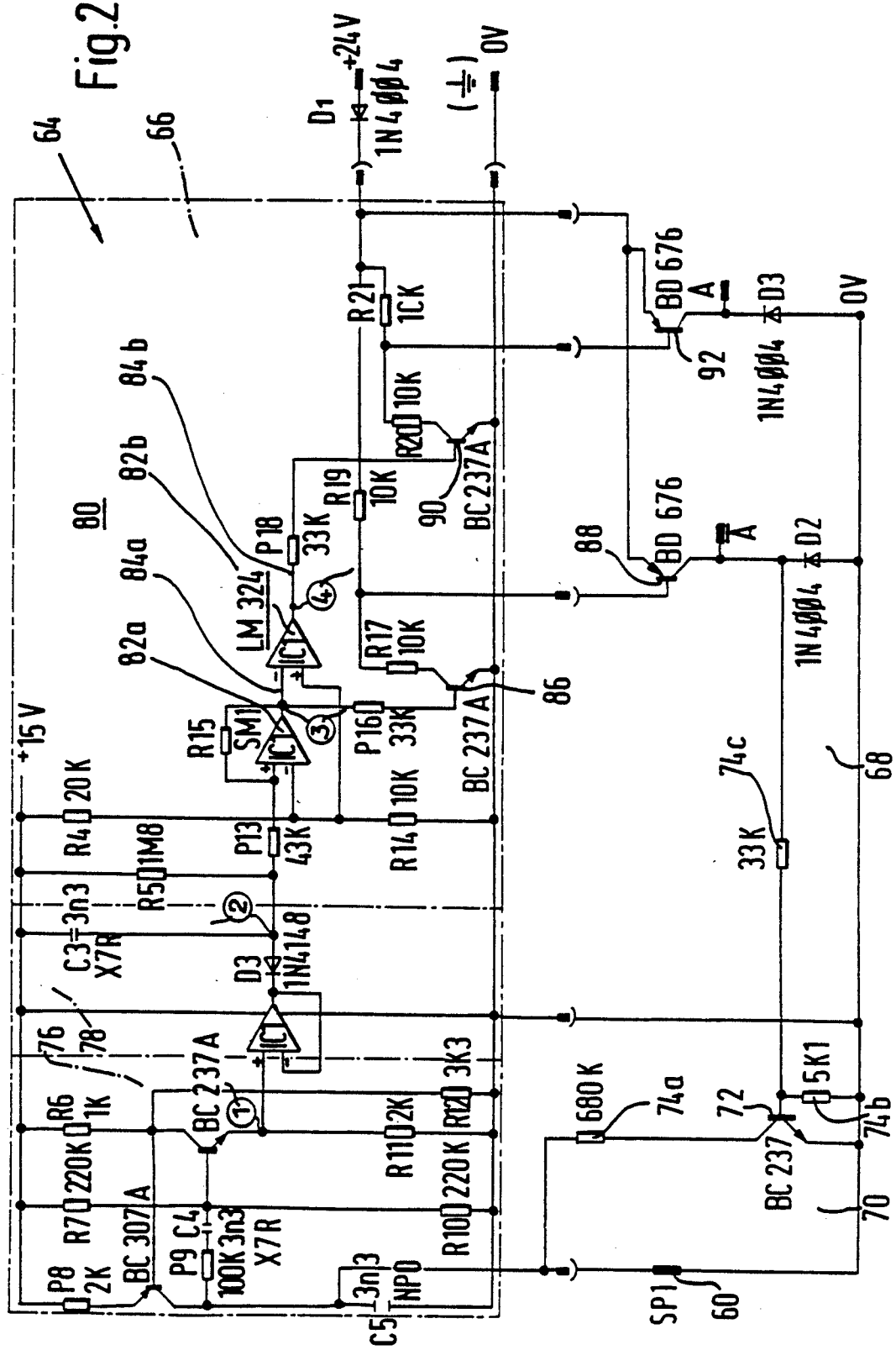
FIG. 2 is a schematic circuit diagram of the electronic control of the passage for the solenoid valve of FIG. 1.

Coil 60 is configured with its exciter winding 62 being made up of a wire of 0.1 mm diameter and 2600 windings, and is part of an electronic circuit, indicated in its entirety as 64, as is shown in FIG. 2. This circuit 64 controls the passage within valve 10, and comprises known switching circuit 66, generally used for a proximity switch. In the restoring or return mechanism 68, a switching circuit member 70 is present and is connected with coil 60, producing a switching hysteresis. The switching circuit member 70 producing the switching hysteresis is essentially formed of a transistor 72 as a switch and three resistances 74a, 74b and 74c, producing a selected switch threshold for transistor 72 and producing an efficient, high-quality modification.

The switching circuit 66 corresponding to a proximity switch is essentially formed of three electronic structural components connected one behind the other in a series (shown in dot-dash lines as blocks in FIG. 2). The components are a switching circuit member 76 together with the coil 60 forming an oscillator, to which are attached one switching circuit 78 serving as demodulator (or translating circuit) and one switching circuit 80 serving as comparator. The comparator switching circuit 80 includes essentially two comparators 82a and 82b connected in series one behind the other. The output point 84a of the first comparator 82a is connected to the negative input of the second comparator 82b. Output point 84a of first comparator 82a is furthermore connected with the base or gate connection line of a first transistor 86, which in turn is connected with the base connection line of a third transistor 88. Likewise, the output point 84b of second comparator 82b is connected with the base connection line of a second transistor 90 and through this to the base connection line of a fourth transistor 92. The output points of the third and fourth transistors 88 and 92 indicated with $\overline{A}$ and A in FIG. 2 are of opposite polarity to one another. In order to produce the restoring mechanism 68 of electronic circuit 64, the base connection line of the transistor 72, of the switching circuit 70 producing a switching hysteresis, with transistor 72 serving as a switch, is connected with output point $\overline{A}$ of the third transistor 88.

The method of operation of the solenoid valve 10 and the electronic circuit 64 controlling the cross section of the passage of this valve is now explained. Solenoid valve 10 is represented in FIG. 1 in its closed position. Under the force of the valve spring 56 and the pressure from the pressure medium effecting the free cross section of piston 36, the conically configured seat part 42 of piston 36 is pressed against valve seat 40 of sheathing 38. The connection passage between input bores 44 and discharge bore 46 is blocked.

To produce a free connection between input bores 44 and discharge bore 46, the operation magnet 12 is excited, whereupon armature 20 is thrust to the right in FIG. 1 against the force of valve spring 56. The sliding connection 24 between armature 20 and valve member 22 picks up valve member 23, after armature 20 has passed over a certain thrust distance along the passage. Armature 20 is moved sufficiently far to the right as seen in FIG. 1 without moving valve member 22 along with it, until sliding disk 30 of sliding connection 24 engages the right shoulder 29b of annular groove 28. Because of the prevailing pressure ratio in input bores 44, in discharge 46 and in hollow chamber 50 of piston 36, both valve member 22 and piston 36 remain in the position shown in FIG. 1 during this movement of armature 20, while the control member 58 connected with armature 20, as shown in FIG. 1, is moved to the right for a distance identical to the distance of movement of armature 20, thereby introducing control member 58 further into coil 60 with its exciter winding 62.

A sinusoidal oscillation of great amplitude given at the input of the switching circuit member 78 working as a demodulator, appears at the output point 1 of the switching circuit member 76 which is then performing as an oscillator. The demodulating switching circuit 78, at its output point 2, discharges a voltage of near zero volts, since demodulation of the negative oscillation amplitude is obtained through it. The comparator switching circuit member 80 connected in series after switching circuit member 78 performs as a demodulator and incorporates a switch threshold of approximately 5 volts, so that a low level state is obtained by the prevailing approximately 0 volts at the positive input of the first comparator 82a at the point 3 of output point 84a of the first comparator 82a. With this low level at point 3 of output point 84a, the first transistor 86 and the third transistor 88 are blocked, so that the output point indicated as A of third transistor 88 assumes an approximate prevailing level of 0 volts.

Comparator 82b, which is connected in series to first comparator 82a, functions as an inverter and inverts the level of output point 84a prevailing at point 3. The output point 84a is connected to the negative input of second comparator 82b, so that at the output point 84b of second comparator 82b, indicated as point 4, the high-level state prevails. This leads to the fact that the fourth transistor 92 is connected through second transistor 90, and the output point indicated as A of fourth transistor 92 assumes a +24 volt level (high level).

In both of the bottom diagrams shown in FIG. 3, the relevant switching state of $\overline{A}$ and A is applied to the output points of the third and fourth transistors 88 and 92 over the stroke covered by the rod-shaped control member 58 and armature 20. The switching state described above is indicated with 100 in both of the bottom diagrams of FIG. 3.

The rod-shaped control member 58 is then moved still further to the right and still deeper into coil 60. The sliding disk 30 has not yet come into engagement with the right shoulder 29b in the annular groove 28. Thus, the inductivity of coil 60 has been modified so that an oscillation limitation is no longer given for oscillator switching circuit 76, and the oscillation breaks off suddenly. In this case, a very sharp transition occurs between maximum amplitude (+24 volts) and zero (0 volts), by modification of the stroke covered by control member 58 of only approximately 4–6 hundredths of a millimeter. This switch threshold is indicated as switching point 101 in both bottom diagrams of FIG. 3.

It can be extrapolated, as represented in broken line in FIG. 3, that the path of the switch threshold 101 runs perpendicularly upward. As shown in the top diagram of FIG. 3 in which the flowthrough volume Q is transmitted by means of the stroke of armature 20 or of control member 58, the electronic passage control already provides the message "valve open" (0 volts) at output point A, before the opening of the valve has been initiated by movement of valve member 22 and piston 36 into open position.

This oscillation generated by oscillator switching circuit 76 has thus taken place as described above, since a corresponding dampening is followed by the control member 58 working as a magnet core for coil 60 and the previous oscillation limitation of oscillator is no longer being fulfilled. It produces a direct current of approximately 7 volts at the point 1 in FIG. 2 at the output point of oscillator switching circuit 76. This direct current prevailing at the input of the demodulator switching circuit 78 likewise causes, at the point 2 in FIG. 2, a direct current therein of approximately 7.6 volts. The comparator threshold of +5 volts is exceeded by this arrangement, and the point 3 at output point 84a of first comparator 82a assumes high-level setting, so that the third transistor 88 connected through the first transistor 86 and the output point $\overline{A}$ of the third transistor 88 assumes a +24 volt level. The second summation member or comparator 82b, serving as an inverter, as previously described, turns the voltage at point 3 around. Then, at point 4 of output point 84b of the second comparator 82b, a low-level setting is assumed, so that the second and fourth transistors 90 and 92 are blocked and the output point A of fourth transistor 92 assumes a 0 volt level. This switching state 103 is indicated in both of the diagrams at the bottom of FIG. 3. Insofar as the sliding play in sliding connection 24 has not been exceeded, the valve, produced out of the curve segment 110a of the flow diagram shown in FIG. 3, remains closed.

As soon as sliding disk 30 engages the right shoulder 29b of annular groove 28, the further movement of armature 20 to the right, then moves valve member 22 along with it to the right. The conically tapered point 34 of valve member 22 comes out of engagement with the first opening 48, so that through input bores 44 and second opening 52 the connection passage for the flowthrough of a pressure medium from the pressure source to the user is freed through the first opening 48. By this means, the pressure forces from the pressure medium as applied to the free cross section of the piston 36 are modified, so that the piston likewise is moved to the right and frees the direct connection passage between input bores 44 and discharge bore 46. The now freed opening cross section of the connection passage at the beginning of the movement of piston 36 is small in its open position, through the conically configured seat portion 42 of piston 36 and thus the flowthrough volume is correspondingly minimal.

A curve segment corresponding to this flowthrough behavior of the valve is indicated as 110b in the flow diagram in FIG. 3. Valve member 22 forming the servo phase then allows the fine control of the flowthrough volume of the pressure medium flowing from input bores 44 to discharge opening 46 by means of the piston 36 serving as principal phase of the valve. With further movement of valve member 22 to the right, piston 36 is also moved further to the right. This further piston movement frees a considerably larger passage cross section for the flow between input bores 44 and discharge bore 46, so that the flowthrough volume of pressure medium being transported increases from pressure source to user. This condition is indicated in FIG. 3 in the top flow diagram by a curve segment 110c. The flow of pressure medium increases up to a maximum value, in which the piston 36, serving as principal phase, has moved a sufficient distance to the right that it totally frees the connection passage between input bores 44 and discharge bore 46.

If solenoid valve 20 should again be moved out of its completely open setting, the operation magnet 12 is separated from its current source, for instance by means of a shoulder (not shown). The armature 20 is then moved to the left by valve spring 56, configured as a compression spring. Armature 20 carries the sliding disk 30 connected with it as seen in FIG. 1, to the left along with it, until it comes into engagement with the left shoulder 29a of annular groove 28. Movement of armature 20 within the degree of play in the sliding connection 24, in which valve 10 remains completely open, has no influence on the flowthrough volume, which is seen in FIG. 3 in the top flow diagram as the straight line 100d. As soon as sliding disk 30 engates left shoulder 29a of annular groove 28, because of the force of compression spring 56 over valve member 22, the piston 36 forming the principal phase is moved back by valve member 22 to the left into its closed position. The flowthrough volume decreases, as shown in the top flow diagram in FIG. 3 by the obliquely downwardly extending line 110e. Because of the pressure medium forces engaging at this time on valve member 22 and piston 36, piston 36 would also close absolutely reliably, even if valve spring 56 is broken.

With each movement of armature 20 to the left, control member 58 is also moved correspondingly to the left and decreases its depth of introduction in coil 60. In and of itself, the oscillator switching circuit 76 of the switching circuit 66, corresponding to a proximity switch, must again provide a sinusodial oscillation of great amplitude, providing as already described, at output point A of the fourth transistor 92, the "valve closed" signal (+24 volts) as soon as control member 58 has moved to the left and the depth in coil 60 corresponds to the switch threshold 101 during opening.

Extrapolation, of the dotted vertical straight line of the switching threshold 101 from both of the shift diagrams of FIG. 3 upward into the flow diagram of FIG. 3, shows that the electronic passage control would supply the message "valve closed", although the valve would still be in the insecure opened position. In order to provide some help here, the output point indicated with $\overline{A}$ of third transistor 88 is connected over the resistance 74c with the base connection line of transistor 72, for production of a switching hysteresis. Transistor 72 of hysteresis switching circuit member 70 is governed by the 24 volt level at $\overline{A}$, which then prevails at $\overline{A}$, as long as the valve in its open switch position, indicated with 103 in the bottom diagram of FIG. 3.

A resistance is connected in parallel to the oscillator switching circuit 76, and damping is attained. This damping causes the thrust of the switching point 101 in the "valve closed" direction. Control member 58 must be moved correspondingly still further out of coil 60, before the oscillation of oscillator switching circuit 76 can be implemented again. A selected hysteresis is thus produced relative to switching threshold 101, indicated with 104 in both the bottom diagrams of FIG. 3.

Extrapolation by the vertical segment of the switching hysteresis 104 upward into the flow diagram of FIG. 3, which extrapolation is presented as a dotted line, indicates that a certain distance still remains before the valve reaches a completely closed position. In other words, piston 36 has not yet completely blocked the connection passage between pressure source and user, so that a slight flowthrough volume (leakage) of the pressure medium can still flow through between valve seat 40 and seat part 42 (indicated as 100f in the top diagram of FIG. 3). To restrict the leakage as much as possible in this remaining distance, the seat valve would be provided with the fine control phase, which guarantees, for instance, that when uncleanness or contaminates of some sort are on the valve seat 40 in the remaining distance and are no longer recognized by the control mechanism, this does not lead to an unacceptably high flowthrough. Thus, piston 36 is pressed with is conical seat part 42 to become force-locking against valve seat 40 of sheathing 38 by means of valve member 22, and is held there in its closed position.

An unequivocal control of the closed valve position is attained with the electronic passage control arrangement shown in this case, but the +24 volts at output point A when the valve is located in the closed, in other words in the securely closed, setting, and by the 0 volts when the valve is opened. The unreliable open and nonflowing state could also be incurred with a voltage drop, for instance resulting from cable rupture, so that in this case a rest current principle would be realized.

By means of the output points A and $\overline{A}$ which are in nonequivalent logic state relative to one another (opposite polarity) of the fourth or third transistor 92 and 88, it is possible for a known, and therefore not further described, logic circuit to be connected in series with the electronic passage control arrangement 64 to exercise reliable cable rupture recognition within the electronic circuit 64. In the case of a cable rupture in the electronic passage control 64, both of the output points of circuit A and $\overline{A}$ in turn would assume the +24 volt level, which would represent a critical switching state. The logic circuit could then disconnect the entire system, so that accidents would then be avoided.

While various embodiments have been chosen to illustrate the invention, it will be understood by those skilled in the art that various changes and modifications can be made therein without departing from the scope of the invention as defined in the appended claims.

What is claimed is:

1. A solenoid valve, comprising:
   a fluid flow passage with a cross section;
   an operating magnet;
   an armature mounted within said operating magnet for reciprocating movement;
   a valve member connected to said armature by a sliding connection permitting limited relative axial movement between said valve member and said armature, movement of said valve member being controlled by said armature;
   a valve spring biasing said armature toward a closed position of the valve;
   a control member extending from said armature; and
   electronic circuit means for controlling the cross section of said fluid flow passage, said circuit means including a coil with an exciter winding, said control member being received and movable in said coil, said circuit means including a switching circuit for proximity switches having a restoring means connected with said coil, and a switching means for producing a switching hysteresis.

2. A solenoid valve according to claim 1 wherein said switching means comprises a switch transistor operating as a switch and three resistors providing a selected switch threshold for said switch transistor and effective modification.

3. A solenoid valve according to claim 2 wherein said switching circuit comprises a first switching circuit member forming an oscillator with said coil, a second switching circuit member forming a demodulator and a third switching circuit member forming a comparator, said switching circuit members being connected in series one behind the other.

4. A solenoid valve according to claim 3 wherein said switching circuit member comprises first and second comparators connected in series one behind the other, said first comparator having an output point downstream of the second switching circuit member, said output point being connected to a negative input of said second comparator.

5. A solenoid valve according to claim 4 wherein said first and second comparators are connected with base connection lines of first and second transistors, respectively, said first and second transistors being connected to base connection lines of third and fourth transistors, respectively.

6. A solenoid valve according to claim 5 wherein said third and fourth transistors comprise output points of opposite polarity relative to controlling logic of said electronic circuit means.

7. A solenoid valve according to claim 5 wherein said switch transistor is connected with an output point of said third transistor.

8. A solenoid valve according to claim 1 wherein said control member is a rod shaped member connected to said armature.

9. A solenoid valve according to claim 1 wherein said sliding connection comprises a sliding member fixed to one of said valve member and said armature, and two shoulders between which said sliding member can slide on the other of said valve member and said armature.

10. A solenoid valve according to claim 9 wherein said sliding member comprises a sliding disk engaged in an annular groove in said valve member, said sliding disk being fixedly attached to said armature and being engagable with said shoulders, said shoulders defining axial ends of said annular groove.

11. A solenoid valve according to claim 1 wherein said valve member forms a servo phase of the valve; and another part forms a principal phase of the valve.

12. A solenoid valve according to claim 11 wherein said principal phase comprises a piston movable between open and closed positions relative to a mating valve seat to permit free flow or block flow of pressure fluid through said fluid flow passage;
   said piston comprises a hollow internal chamber, a first opening connecting said chamber to a user flow passage and controlled by said valve member, and a second opening connecting said chamber to a pressure source passage.

13. A solenoid valve according to claim 12 wherein said piston comprises a frustoconical seat part facing said valve seat.

14. A solenoid valve according to claim 12 wherein said valve member comprises a conically tapered end facing said first opening.

15. A solenoid valve, comprising:
   a fluid flow passage with a cross section;
   an operating magnet;
   an armature mounted within said operating magnet for reciprocating movement;
   a valve member connected to said armature by a sliding connection permitting limited relative axial movement between said valve member and said armature, movement of said valve member being controlled by said armature, said sliding connection including a sliding member fixed to one of said valve member and said armature, and two shoulders between which said sliding member can slide on the other of said valve member and said armature;
   a valve spring biasing said armature toward a closed position of the valve;
   a control member extending from said armature; and
   electronic circuit means for controlling the cross section of said fluid flow passage, said circuit means including a coil with an exciter winding, said control member being received and movable in said coil.

16. A solenoid valve according to claim 15 wherein said sliding member comprises a sliding disk engaged in an annular groove in said valve member, said sliding disk being fixedly attached to said armature and being engagable with said shoulders, said shoulders defining axial ends of said annular groove.

17. A solenoid valve, comprising:
   a fluid flow passage with a cross section;
   an operating magnet;
   an armature mounted within said operating magnet for reciprocating movement;
   a valve member connected to said armature by a sliding connection permitting limited relative axial movement between said valve member and said armature, movement of said valve member being controlled by said armature, said valve member forming a servo phase of the valve and another part forming a principal phase of the valve, said principal phase including a piston movable between open and closed positions relative to a mating valve seat to permit free flow or block flow of pressure fluid through said fluid flow passage, said piston including a hollow internal chamber, a first opening connecting said chamber to a user flow passage and controlled by said valve member, and a second opening connecting said chamber to a pressure source passage;

a valve spring biasing said armature toward a closed position of the valve;

a control member extending from said armature; and electronic circuit means for controlling the cross section of said fluid flow passage, said circuit means including a coil with an exciter winding, said control member being received and movable in said coil.

18. A solenoid valve according to claim 19 wherein said piston comprises a frustoconical seat part facing said valve seat.

19. A solenoid valve according to claim 19 wherein said valve member comprises a conically tapered end facing said first opening.

* * * * *